Aug. 6, 1929.  H. SHOEMAKER  1,723,584
RECTIFYING DEVICE
Filed March 5, 1926  2 Sheets-Sheet 1

INVENTOR.
Harry Shoemaker
BY
Mayer, Warfield & Watson
ATTORNEYS.

Aug. 6, 1929.  H. SHOEMAKER  1,723,584
RECTIFYING DEVICE
Filed March 5, 1926  2 Sheets-Sheet 2

INVENTOR.
Harry Shoemaker
BY
Mayer, Warfield & Watson
ATTORNEYS.

Patented Aug. 6, 1929.

1,723,584

UNITED STATES PATENT OFFICE.

HARRY SHOEMAKER, OF JERSEY CITY, NEW JERSEY, ASSIGNOR, BY MESNE ASSIGNMENTS, TO P. R. MALLORY & CO. INCORPORATED, OF INDIANAPOLIS, INDIANA, A CORPORATION OF INDIANA.

RECTIFYING DEVICE.

Application filed March 5, 1926. Serial No. 92,514.

This invention relates to rectifying devices and more particularly to portable devices arranged for charging batteries and the like at a relatively low rate.

The object generally of the invention is to provide a device of the character specified which is efficient, economical and readily manufactured.

More specifically an object of the invention is to provide a rectifying device which employs an asymmetric cell or the like and is arranged to be portable and adapted to be attached to an ordinary commercial source of alternating current and thereby obtain a direct current of suitable voltage and magnitude.

Another object is to provide an arrangement for a rectifying device which is convenient of assembly occupying but relatively little space, employing asymmetric cells preferably arranged as individually removable units and of the dry-surface contact variety, such units being taken in sufficient number and arrangement to convert a given alternating current voltage into a suitable direct current voltage.

Other objects of the invention will in part be obvious and will in part appear hereinafter.

The invention accordingly comprises the features of construction, combinations of elements, and arrangement of parts, which will be exemplified in the constructions hereinafter set forth and the scope of the application of which will be indicated in the claims.

For a fuller understanding of the nature and objects of the invention, reference should be had to the following detailed description, taken in connection with the accompanying drawing, in which:

Fig. 2 is a schematic diagram showing the electrical system involved in the rectifying device shown in Fig. 1; while

Figure 1:
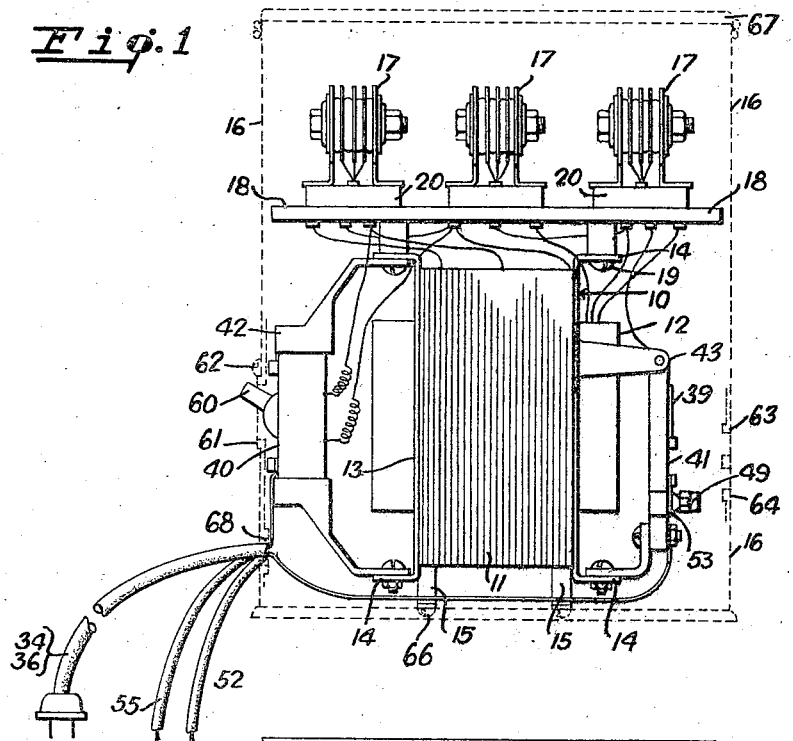
Figure 1 is a view mainly in side elevation showing an arrangement of elements adapted to make a portable rectifying device in accordance with the invention, the presence of a casing therefor being indicated in broken lines.

Rectifying devices made in accordance with the present invention preferably employ asymmetric cells or rectifying units of the dry-surface contact variety, such for example as are shown and described in connection with the applications for Letters Patent of Samuel Ruben, Serial No. 39,188, filed November 22, 1924, Serial No. 38,780, filed June 22, 1925, and Serial No. 69,215 filed November 16, 1925; which cells or units accomplish the actual conversion of the alternating current into direct current, but utilize the electrical system disclosed in the application of Samuel Ruben, Serial No. 750,939, filed November 18, 1924, for transforming the voltage of the input alternating current into a suitable direct current voltage. The electrical system involves stepping down of the voltage of a commercial source of alternating current to a voltage suitable to be impressed individually across each of a plurality of rectifying units proper, which are arranged in series to give a direct current voltage of desired magnitude, the stepping down of the alternating current voltage being accomplished by a transformer or other suitable induction device.

Referring now to the drawing, 10 denotes a stationary induction device of the transformer variety having a laminated magnetic core 11, preferably of the shell type, and provided with inductive windings 12.

The magnetic core is held in place by means of a frame 13, here shown as made of strap metal having upset ends 14 to provide suitable securing brackets to which the remaining assembly elements of the rectifying device are secured.

Standards 15 are associated with the frame 13 as shown in order to support the stationary induction device in place on the bottom of a suitable casing, here indicated by broken lines at 16.

Figure 3:
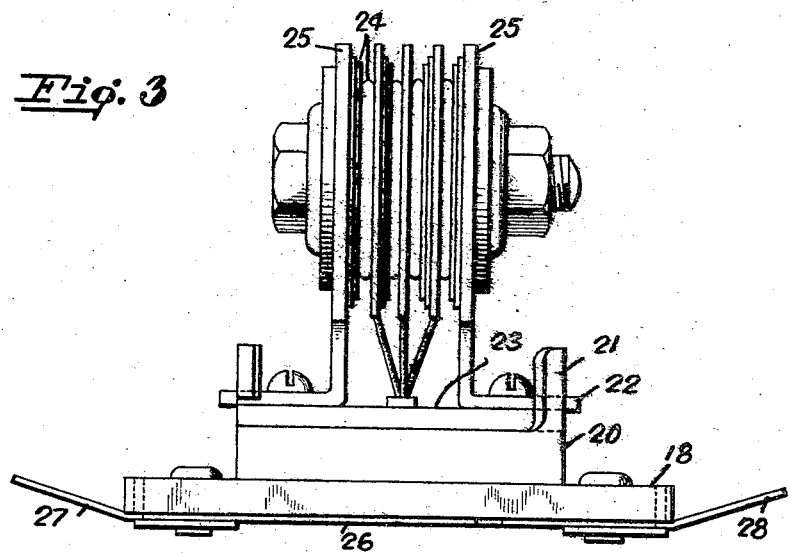
Figs. 3 and 4 are elevational views in planes respectively at right angles to each other illustrating the details of the dry-surface contact variety of rectifying unit, indicated as used in Figs. 1 and 2.
Figure 4:
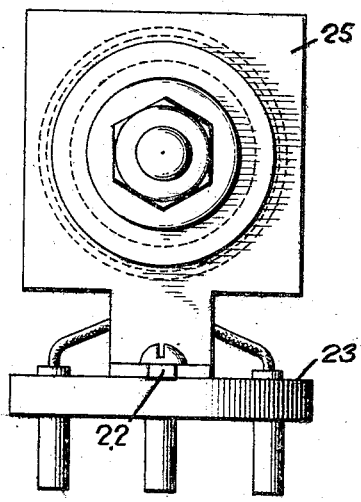

In the arrangement shown three rectifying units 17, each composed of asymmetric cells of the dry surface contact variety and arranged for utilizing both halves of the alternating current wave, are mounted on a suitable baseboard 18, disposed above the stationary induction device and secured to the brackets 14 at the upper end of the frame in any suitable manner, for example, by means of the screws shown at 19. The mounting of the units 17 on the baseboard is preferably accomplished in a removable manner; for example, as shown in my copending application, Serial No. 80,777, filed January 12, 1926. In such arrangement a socket such as here shown at 20 in Fig. 3 is secured to the baseboard 18, the socket having upwardly projecting lugs 21 for making bayonet engagement with the laterally-extending contact prongs 22 which extend from the base proper of the unit, here shown at 23. These prongs are parts of standards, which support the elements of the asymmetric couples in assembled relation thereby providing a removable rectifying unit; such an assembly is indicated at 24, having the elements thereof secured under pressure in combination with the conducting plates 25. Associated with each socket 20 are a plurality of spring contact terminals 26 which are conveniently extended as indicated in Fig. 3 at 27 and 28 to each side of the baseboard 18 for connection with the electrical system employed in the rectifying device.

Figure 2:
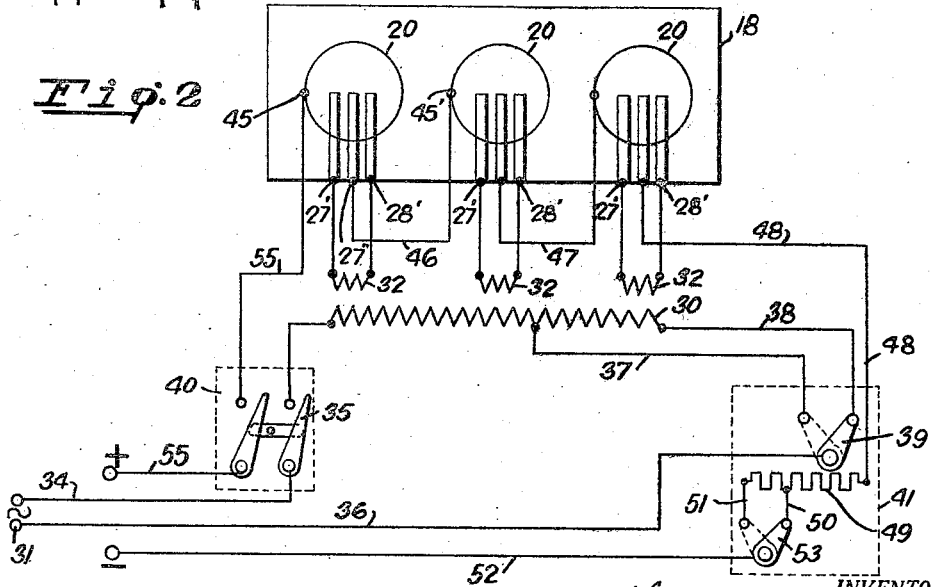

The electrical system is indicated in Fig. 2; the transformer is provided with a primary winding 30 which is connected across the terminals 31 of a source of alternating current, for example, a commercial source such as had from an ordinary lamp socket. The transformer here shown has three separate secondary windings 32 which are connected across the terminals 27' and 28' that constitute the alternating current input terminals associated with the sockets 20.

The lead-in connection 34 to one side of the primary winding 30 is arranged to be interrupted by one side of the double-pole single-throw switch 35. The other side of the primary winding is arranged to be directly connected to the other side of the alternating current source by means of the lead-in connection 36. This side, however, preferably has a tap connection 37 leading from an intermediate point in the primary winding so as to step-up the input alternating current voltage across the primary when necessary. Accordingly, the tap connection 37 and the end connection 38 lead to a voltage-changing switch 39 interposed in the lead-in connection 36. The switches 35 and 39 are preferably mounted on suitable insulating bases 40 and 41 respectively, which are supported by brackets 42 and 43 from the frame 13 of the stationary induction apparatus. The presence of these insulating bases in Fig. 2 is indicated diagrammatically by broken lines.

The rectifying units 17 are connected in series in the direct current circuit. One terminal of the direct current output circuit is shown at 45 on the baseboard 18; this terminal as indicated is the one which is conductively connected to the socket 20. The other direct current terminal of the socket 20 is indicated at 27'' and is conductively connected by means of the electric conductor 46 with a terminal 45' conductively connected with the second socket 20. This second socket 20 has its other direct current terminal electrically connected by means of the conductor 47 to the terminal conductively connected with the third socket 20, the other direct current or mid-terminal of this third socket constituting the terminal for the other side of the direct current output circuit and has associated therewith the leading conductor 48.

The leading conductor 48 preferably includes a series-ballast resistance 49 which may be conveniently mounted on the insulating base 41 as indicated. This ballast resistance, as shown in Fig. 2, preferably has taps 50 and 51, to which the line conductor 52 is connected by means of the tap-changing switch 53 in order to alter the voltage drop interposed in the line by the ballast resistance 49. The line conductor 55 leading from the terminal 45 of the first-mentioned side of the direct current circuit is preferably arranged to be interrupted by means of the other side of the double-pole single-throw switch 35, as shown.

It is thus seen that the rectifying device of this invention, when utilizing the electrical system, diagrammatically illustrated in Fig. 2, may be thrown into and out of operation by manipulating the double-pole single-throw switch 35 since such manipulation opens or closes simultaneously both the alternating current and the direct current circuits. When this switch is in closed position, the direct current output circuit is closed and traversed by direct current from the rectifying units, while at the same time the alternating input circuit is energized by alternating current from terminals 31, which traverses the primary winding 30 to impress suitable voltage across units 17. The voltage-changing switch 39 by being thrown to make contact with the tap connection 37 is adapted to increase the voltage across the primary connection 30, while the switch 53 is adapted to alter the direct current output voltage had from the connection of the units 17 in series by altering the voltage drop in the series-connected ballast-resistance 49.

By use of the arrangement of the present invention, it will be seen that the manufacture and assembly are facilitated, since the disposition of the elements thereof is arranged in a plurality of assembly units. The stationary induction device 10 is seen to comprise one assembly unit which includes the magnetic core and inductive windings disposed thereon and has a frame which is made the uniting element for the other assembly units. The baseboard 18 which serves as a support on which to mount the three rectifying units 17 constitutes another assembly unit which is adapted to be attached to the frame. In like manner the insulating base 40, which supports the double-pole single-throw switch 35, is another assembly unit that is held in place by means of the brackets 42 on one side of the frame. The brackets 42, as shown in Fig. 1, are preferably not rigidly attached to the insulating base 40, since the handle 60, which manipulates the double-pole single-throw switch 35 preferably projects through an opening, indicated in broken lines at 61, in the casing 16. Consequently for assembly purposes the insulating base 40 is preferably slidable back and forth in the brackets 42 so as to permit the switch handle 60 being pushed sufficiently back into the opening 61 so as to clear the same when the rectifying device is being withdrawn from the casing 16. This switch is preferably held rigidly in proper position in any convenient detachable manner, for example, by means of the screw 62, which is passed through the casing 16 just above the opening 61 into engagement with the insulating base 40.

The insulating base 41 likewise comprises another assembly unit on which are mounted the switches 39 and 52, which, for the purposes of simplicity of construction, may consist merely of a turnable arm adapted to be shifted from one button contact to another. This shifting may be accomplished in any convenient manner, for example, by means of a screwdriver or key (not shown). In order that such device may be manipulated from the outside of the casing 16, when the insulating board is in assembled position, the casing 16 is provided with a pair of openings, which are shown in broken lines at 63 and 64, opposite the points of the pivotal attachment of the turning arms 53 and 39 to the insulating base 41. The ballast resistance 49, as indicated in Fig. 1, may be of any convenient variety and is preferably mounted across this base as shown. The standards 15 are secured to the bottom of the casing, when the rectifying device is inserted, in any convenient manner; for example, by means of the screws shown in broken lines at 66.

The casing 16, as indicated in Fig. 1, preferably has a removable cover 67, the casing as a whole being shown in broken lines because it constitutes no part of the present invention. When the screws 62 and 66 are removed, the rectifying device is adapted to be withdrawn from the casing after the base 40 containing the double-pole single-throw switch 35 is pushed back so that the handle 60 clears the casing. When withdrawing the unit, obviously the conducting leads 34, 36, 52 and 55 are pulled through one or more openings 68 formed in the casing to accommodate them. The insertion of the rectifying unit after the original assembly involves merely the reverse of this operation.

Since certain changes may be made in the above article and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent is:

1. A portable rectifying device comprising a plurality of assembly units, one of said units including a stationary induction device having a uniting element, adapted for holding intact the stationary inductive device, a second assembly unit including a baseboard provided with a removable rectifying unit, said second unit secured to said uniting element above said stationary induction device, a third assembly unit including an insulating base secured to said uniting element adjacent to said stationary induction device and supporting electrical switches adapted to control the electrical circuits including said stationary induction device and the rectifying unit, and a casing adapted detachably to envelop said uniting element and assembled units.

2. A portable rectifying device comprising a plurality of assembly units, one of said units including a stationary induction device provided with a magnetic core and a clamping frame arranged as a uniting element, a second assembly unit including a baseboard secured to said frame adjacent said induction device and provided with a removable dry surface contact rectifying unit, a third assembly unit including an insulating base secured to said frame adjacent said induction device and provided with current-controlling means adapted to control the electrical circuits including said induction device and said removable rectifying unit, and a casing adapted detachably to envelop said uniting element and assembled units.

3. A portable rectifying device comprising a plurality of assembly units, one of said units including a stationary induction device provided with a magnetic core and a clamping frame arranged as a uniting element, a second assembly unit including a baseboard provided with a plurality of removable dry surface contact rectifying units, said baseboard secured to said frame above said stationary induction device, a plurality of additional assembly units each including an insulating base provided with circuit controlling devices arranged to control the electrical circuits including said stationary induction device and said removable rectifying units, each of said insulating bases being secured to said frame at the side of said stationary induction device, and a casing adapted detachably to envelop said uniting element and assembled units.

4. A portable rectifying device comprising a plurality of assembly units, one of said units including a stationary induction device provided with a magnetic core and a clamping frame arranged as a uniting element, a second assembly unit including a baseboard provided with a plurality of removable dry surface rectifying units, said baseboard secured to said frame above said stationary induction device, a third assembly unit including an insulating base having a double-throw switching device arranged to control simultaneously the direct current and alternating current circuits of said rectifying device and secured to said frame at the side of said stationary induction device, a fourth assembly unit including an insulating base provided with circuit controlling devices adapted to change the voltage independently of said direct current and alternating current circuits of said rectifying devices, said second insulating base being secured to said frame on the opposite side of said stationary induction device from that to which the first said insulating base is secured, and a casing shaped to envelop said uniting element and assembled units and arranged to be detachably secured thereto.

5. A portable rectifying device comprising a plurality of assembly units, one of said units including a stationary induction device having a uniting element, a second assembly element including a baseboard provided with a removable rectifying unit and secured to said uniting element adjacent said stationary induction device, a third assembly unit including a switching device slidably secured to said uniting element and provided with a projecting handle for manipulating said switching device, and a casing for said rectifying device having an opening through which said handle is adapted to project, said switching device being arranged to slide sufficiently so that said handle will clear said opening when said rectifying device is being inserted or withdrawn from said casing.

6. A portable rectifying device comprising a plurality of assembly units, one of said units including a stationary induction device having a magnetic core and a clamping frame arranged as a uniting element, a second assembly unit including a baseboard secured to said frame above said induction device and provided with a plurality of removable dry surface contact rectifying units, a third assembly unit including an insulating base secured to said frame at one side of said induction device and provided with voltage controlling devices for the circuits including said induction device and said rectifying units, a fourth assembly unit including an insulating base slidably secured to said frame on the side of said stationary induction device opposite to the first mentioned insulating base, and having a switching device provided with a projecting handle for manipulating the same, a casing for said rectifying device, said casing having an opening through which said handle is adapted to project, said second mentioned insulating base being adapted to slide in its mountings sufficiently to permit said handle to clear said opening when the rectifying device is being inserted or withdrawn from said casing.

In testimony whereof I affix my signature.

HARRY SHOEMAKER.